(12) United States Patent
Fine et al.

(10) Patent No.: US 7,212,290 B2
(45) Date of Patent: May 1, 2007

(54) DIFFERENTIAL INTERFEROMETERS CREATING DESIRED BEAM PATTERNS

(75) Inventors: Kevin R. Fine, Menlo Park, CA (US); Greg C. Felix, San Jose, CA (US); John J. Bockman, Santa Clara, CA (US); Douglas P. Woolverton, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 313 days.

(21) Appl. No.: 10/900,529

(22) Filed: Jul. 28, 2004

(65) Prior Publication Data

US 2006/0039005 A1    Feb. 23, 2006

(51) Int. Cl.
*G01B 9/02*    (2006.01)

(52) U.S. Cl. ...................... 356/495; 356/493

(58) Field of Classification Search ............... 356/491, 356/492, 493, 495; 359/577
See application file for complete search history.

(56) References Cited

U.S. PATENT DOCUMENTS

| | | | |
|---|---|---|---|
| 4,693,605 A | 9/1987 | Sommargren | |
| 4,930,894 A | 6/1990 | Baldwin | |
| 5,682,446 A * | 10/1997 | Pan et al. | 385/11 |
| 6,523,958 B2 * | 2/2003 | Takezawa et al. | 353/20 |
| 6,542,247 B2 | 4/2003 | Bockman | |
| 6,836,335 B2 * | 12/2004 | Hill et al. | 356/493 |
| 2004/0156134 A1 * | 8/2004 | Furuki et al. | 359/883 |

* cited by examiner

*Primary Examiner*—Gregory J. Toatley, Jr.
*Assistant Examiner*—Michael A. Lyons

(57) ABSTRACT

An interferometer system includes a rhomboid assembly having a first optical stack and a second optical stack mounted on the first stack. The first stack includes a first prism having an angled face mounted to an angled face of a second prism. The interface between these angled faces includes a first polarizing beam-splitter. The second stack includes a third prism having an angled face mounted to an angled face of the fourth prism. The interface between these angled faces includes a second polarizing beam-splitter. First, second, third, and fourth wave plate elements are located in beam paths between the rhomboid assembly and at least one of a measurement optic and a reference optic. A redirecting optic is located at least adjacent to the vertical faces of the first and the third prisms.

40 Claims, 9 Drawing Sheets

DIFFERENTIAL INTERFEROMETERS CREATING DESIRED BEAM PATTERNS

DESCRIPTION OF RELATED ART

In some differential interferometer applications, it is desired to have an inline beam pattern consisting of two reference beam passes between two measurement beam passes (or vice versa), or a 2-dimensional beam pattern consisting of upper left and lower right measurement beam passes and upper right and lower left reference beam passes (or vice versa). U.S. Pat. No. 4,693,605 ("Sommargren") discloses a way of constructing a differential interferometer system using a shear plate and a separate polarizing beam-splitter (PBS) assembly to achieve the desired 2-dimensional beam pattern. In Sommargren, half-wave plates are inserted between the shear plate and the PBS for proper operation. This is a complicated and costly way to generate a desired measurement and reference beam pattern. Thus, what is needed is a simpler interferometer system that eliminates the separate PBS assembly while achieving the desired beam pattern with minimal glass usage.

SUMMARY

In one embodiment of the invention, an interferometer system includes a first optical stack and a second optical stack mounted thereon. The first optical stack includes a first prism having an angled face (e.g., angled at 45 degrees) mounted to an angled face (e.g., angled at 45 degrees) of a second prism. The interface between these angled faces includes a first polarizing beam-splitter. The second optical stack includes a third prism having an angled face (e.g., angled at 45 degrees) mounted to an angled face (e.g., angled at 45 degrees) of the fourth prism. The interface between these angled faces includes a second polarizing beam-splitter. The angled faces of the first prism and the second prism are aligned with the angled face of the fourth prism. First, second, third, and fourth wave plate elements are located in beam paths between the rhomboid assembly and at least one of a measurement optic and a reference optic. A redirecting optic is located at least adjacent to the vertical faces of the first and the third prisms.

BRIEF DESCRIPTION OF THE DRAWINGS

Use of the same reference numbers in different figures indicates similar or identical elements.

DETAILED DESCRIPTION

In accordance with embodiments of the invention, differential interferometer systems incorporate the functions of the shear plate and the polarizing beam-splitter (PBS) with a rhomboid assembly or a shear plate assembly, thereby eliminating the large square PBS and the accompanying large cube corner retroreflectors commonly found in conventional interferometer systems. These systems achieve the desired beam patterns with minimal glass usage. Furthermore, these systems are inherently smaller and can be nested close together and stacked for multi-axis measurements. Accordingly, smaller, lighter, and less costly interferometer systems are provided.

Figure 1:
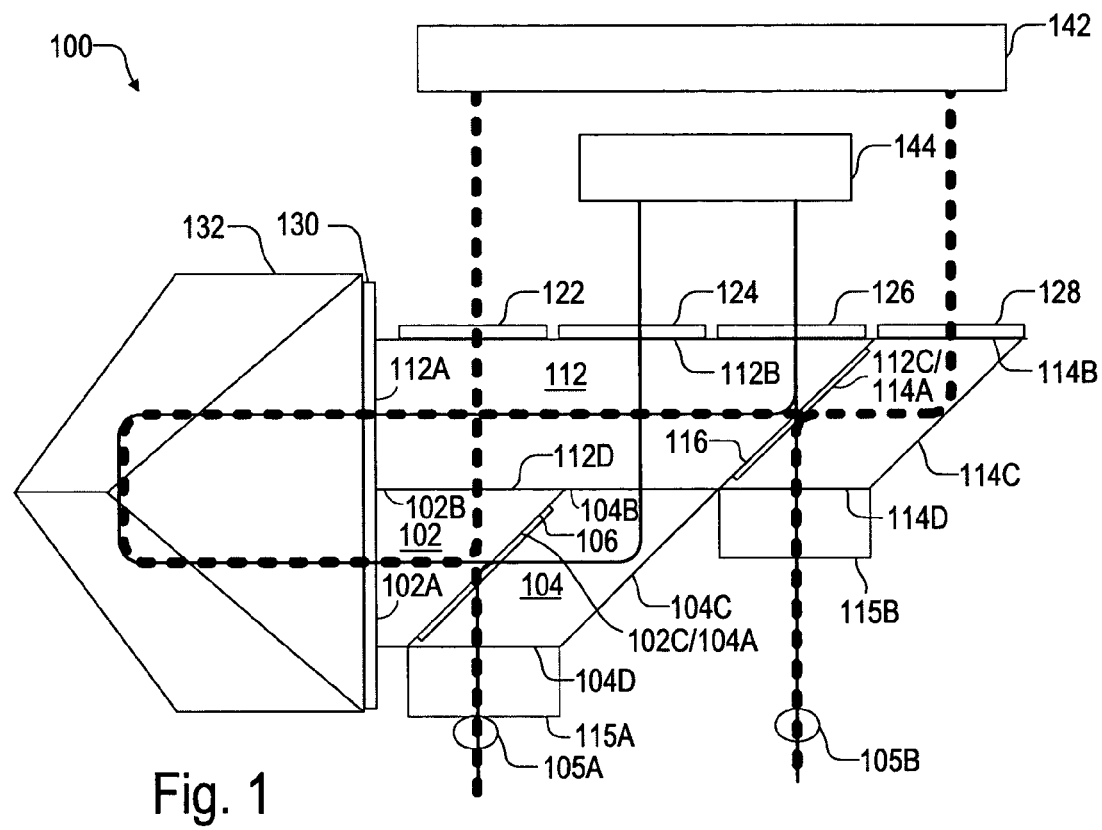
FIGS. 1, 2, 3, 4, 5, 6, 7, 8A, 8B, 8C, 9A, 9B, and 9C illustrate interferometer systems in embodiments of the invention.

FIG. 1 illustrates a differential interferometer system 100 in one embodiment of the invention. Interferometer system 100 includes a rhomboid assembly having an upper optical stack mounted atop a lower optical stack. The lower optical stack includes a prism 102 and a prism 104. Prism 102 has a vertical face 102A, a horizontal face 102B, and an angled face 102C (e.g., angled at 45 degrees). Prism 104 has an angled face 104A (e.g., angled at 45 degrees), a horizontal face 104B, an angled face 104C (e.g., angled at 45 degrees), and a horizontal face 104D. An optical window 115A with antireflection (AR) coating (hereafter "AR window") is mounted to horizontal face 104D to serve as an input port for an input beam 105A. Note that angled face 104C serves as a total internal reflection (TIR) mirror.

Prism 102 is mounted to prism 104 by fixing (e.g., gluing) angled face 102C to angled face 104A. A polarizing beam-splitter (PBS) 106 is formed at the interface between prisms 102 and 104. In one embodiment, PBS 106 is a PBS coating formed on either angled face 102C or 104A.

The upper optical stack includes a prism 112 and a prism 114. Prism 112 has a vertical face 112A, a horizontal face 112B, an angled face 112C (e.g., angled at 45 degrees), and a horizontal face 112D. Prism 114 has an angled face 114A (e.g., angled at 45 degrees), a horizontal face 114B, an angled face 114C (e.g., angled at 45 degrees), and a horizontal face 114D. An AR window 115B is mounted to horizontal face 114D to serve as an output port for an output beam 105B. Note that angled face 114C serves as a TIR mirror.

Prism 112 is mounted to prism 114 by fixing angled face 112C to angled face 114A. A PBS 116 is formed at the interface between prisms 112 and 114. In one embodiment, PBS 116 is a PBS coating formed on either angled face 112C or 114A. PBS 116 and 106 provide path isolation and recombination by propagating one linear polarization (e.g., vertical polarization) and reflecting another orthogonal linear polarization (e.g., horizontal polarization). Note that angled face 112C is aligned with angled face 104C.

The upper optical stack is mounted atop the lower optical stack by fixing horizontal face 112D to horizontal faces 102B and 104B.

Quarter-wave plate elements 122, 124, and 126 are mounted directly atop or indirectly above horizontal face 112B opposite PBS 106, mirror 104C, and PBS 116, respectively. A quarter-wave plate (QWP) element 128 is mounted directly atop or indirectly above horizontal face 114B opposite mirror 114C. A QWP 130 is mounted directly on or indirectly adjacent to vertical faces 102A and 112A. A redirecting optic 132 (e.g., a cube corner retroreflector) has its entrance/exit face mounted directly on or indirectly adjacent to QWP 130. Although illustrated individually, QWP elements 122, 124, 126, and 128 can be individual QWPs or part of a single QWP.

The path through interferometer 100 is explained hereafter. A laser source (not shown) generates a coherent, collimated input beam 105A to input port 115A. Input beam 105A consists of two orthogonally polarized frequency components. One frequency component $f_A$ (e.g., a linearly polarized measurement beam initially having a horizontal polarization and is illustrated as a dotted heavy line) enters the system's measurement path while the other frequency component $f_B$ (e.g., a linearly polarized reference beam initially having a vertical polarization and is illustrated as a continuous thin line) enters the system's reference path.

In the measurement path, input beam 105A propagates through input port 115A and impinges PBS 106. With their initial polarizations, the measurement beam propagates through PBS 106 while the reference beam reflects from PBS 106. The measurement beam then propagates through QWP 122 and onto a measurement plane mirror 142. Measurement plane mirror 142, which is typically mounted to a mobile stage, reflects the measurement beam back onto itself and through QWP 122. Since the measurement beam passes twice through QWP 122, the returning polarization is rotated 90 degrees and the now vertically polarized measurement beam is orthogonally reflected by PBS 106 through QWP 130 and into retroreflector 132.

Retroreflector 132 returns the measurement beam in an offset but parallel path through QWP 130. Since the measurement beam passes twice through QWP 130, the returning polarization is rotated 90 degrees and the now horizontally polarized measurement beam is propagated through PBS 116 and onto mirror 114C. Mirror 114C orthogonally reflects the measurement beam through QWP 128 and onto measurement plane mirror 142. Measurement plane mirror 142 reflects the measurement beam back onto itself and the measurement beam retraces its path back to PBS 116. After passing twice through QWP 128, the vertically polarized measurement beam now reflects from PBS 116 so it propagates through output port 115B and into a detector (not shown).

In the reference path, PBS 106 orthogonally reflects the reference beam to mirror 104C. Mirror 104C orthogonally reflects the reference beam through QWP 124 and onto a stationary reference plane mirror 144. Reference plane mirror 144 reflects the reference beam back onto itself and the reference beam retraces its path back to PBS 116. After passing twice through QWP 124, the horizontally polarized reference beam now propagates through PBS 106 and QWP 130, and into retroreflector 132.

Retroreflector 132 returns the reference beam in an offset but parallel path through QWP 130. After passing twice through QWP 130, the vertically polarized reference beam now reflects from PBS 116 so it propagates through QWP 126 and onto reference plane mirror 144. Reference plane mirror 144 reflects the reference beam back onto itself, through QWP 126, and back to PBS 116. After passing twice through QWP 126, the horizontally polarized reference beam now propagates through PBS 116 and recombines with the measurement beam to form output beam 105B. Output beam 105B then propagates through output port 115B and into the detector. The detector can detect phase changes to determine a change in the displacement of measurement plane mirror 142.

As described above, interferometer 100 generates a beam pattern in which two reference beam passes are sandwiched between two measurement beam passes. Of course, the directions of the measurement and reference paths can be reversed so that the input beam 105A enters port 115B and output beam 105B exits port 115A. Furthermore, the measurement and the reference paths can be swapped so that two measurement beam passes are sandwiched between two reference beam passes.

In one embodiment, QWP 130 is replaced with a half-wave plate (HWP) mounted directly on or indirectly adjacent to either vertical face 102A or 112A to generate the same beam pattern. In another embodiment, QWP 130 is removed all together to generate a different beam pattern consisting of a first measurement beam pass, a first reference beam pass, a second measurement beam pass, and a second reference beam pass.

Figure 2:
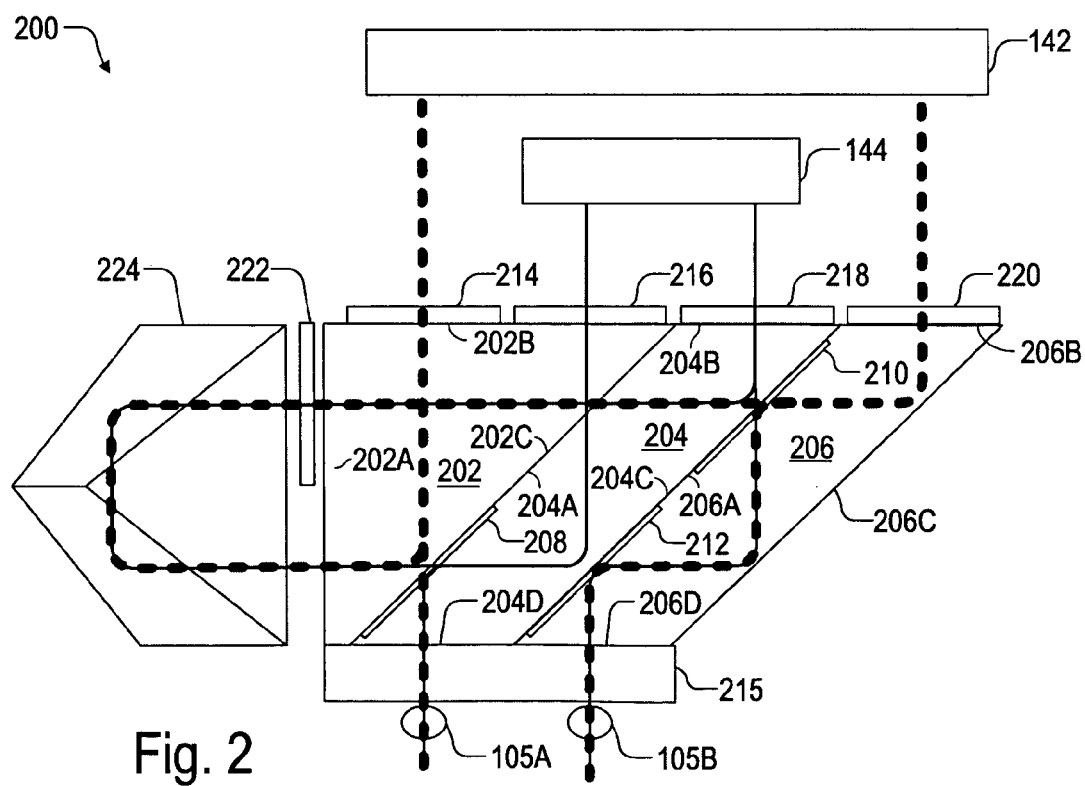

FIG. 2 illustrates a differential interferometer system 200 in one embodiment of the invention. Interferometer system 200 includes a rhomboid assembly having an optical stack consisting of prisms 202, 204, and 206. Prism 202 has a vertical face 202A, a horizontal face 202B, and an angled face 202C (e.g., angled at 45 degrees). Prism 204 has an angled face 204A (e.g., angled at 45 degrees), a horizontal face 204B, an angled face 204C (e.g., angled at 45 degrees), and a horizontal face 204D. Prism 206 has an angled face 206A (e.g., angled at 45 degrees), a horizontal face 206B, an angled face 206C (e.g., angled at 45 degrees), and a horizontal face 206D. Note that angled face 206C serves as a TIR mirror.

Prism 202 is mounted to prism 204 by fixing (e.g., gluing) angled face 202C to angled face 204A. A PBS 208 is formed at the lower half of the interface between prisms 202 and 204. In one embodiment, PBS 208 is a PBS coating formed on either face 202C or 204A.

Prism 204 is mounted to prism 206 by fixing angled face 204C to angled face 206A. A PBS 210 is formed at the upper half of the interface between prisms 204 and 206, and a mirror 212 is formed at the lower half of the interface between prisms 204 and 206. In one embodiment, PBS 210 is a PBS coating formed on either face 204C or 206A, and mirror 212 is a highly reflective (HR) coating formed on either face 204C or 206A. PBSs 210 and 208 provide path isolation and recombination by propagating one linear polarization (e.g., vertical polarization) and reflecting another orthogonal linear polarization (e.g., horizontal polarization).

An AR window 215 is mounted to horizontal faces 204D and 206D to serve as input/output ports for input/output beams 105A and 105B.

QWP elements 214 and 216 are mounted directly atop or indirectly above horizontal face 202B opposite of PBS 208 and mirror 212, respectively. A QWP 218 is mounted directly atop or indirectly above horizontal face 204B opposite PBS 210. A QWP 220 is mounted directly atop or indirectly above horizontal face 206B opposite an upper portion of mirror 206C. Although illustrated individually, QWP elements 214, 216, 218, and 220 can be part of a single QWP mounted on or above the optical stack. A HWP 222 is mounted directly on or indirectly adjacent to the upper portion of vertical face 202A. Alternatively, HWP 222 can be replaced with a QWP that covers the entire vertical face 202A. A redirecting optic 224 (e.g., a cube corner retroreflector) has its entrance/exit face directly mounted on or indirectly mounted adjacent to HWP 222.

In the measurement path, input beam 105A propagates through AR window 215 and impinges PBS 208. With their initial polarizations, the measurement beam propagates through PBS 208 while the reference beam reflects from PBS 208. The measurement beam then propagates through QWP 214 and onto measurement plane mirror 142. Measurement plane mirror 142 reflects the measurement beam back onto itself, through QWP 214, and back to PBS 208. After passing twice through QWP 214, the vertically polarized measurement beam now orthogonally reflects from PBS 208 and propagates into retroreflector 224.

Retroreflector 224 returns the measurement beam in an offset but parallel path through HWP 222. Since the measurement beam passes through HWP 122, its polarization is rotated 90 degrees and the now horizontally polarized measurement beam is propagated through PBS 210. The measurement beam then propagates to an upper portion of mirror 206C. Mirror 206C orthogonally reflects the measurement beam through QWP 220 and onto measurement plane mirror 142. Measurement plane mirror 142 reflects the measurement beam back onto itself and the measurement beam retraces its path back to PBS 210. After passing twice through QWP 220, the vertically polarized measurement beam now orthogonally reflects from PBS 210 and propagates to a lower portion of mirror 206C. Mirror 206C orthogonally reflects the measurement beam onto mirror 212, which orthogonally reflects the measurement beam through AR window 215 and into a detector.

In the reference path, PBS 208 orthogonally reflects the reference beam to mirror 212. Mirror 212 orthogonally reflects the reference beam through QWP 216 and onto reference plane mirror 144. Reference plane mirror 144 reflects the reference beam back onto itself, through QWP 216, and back to mirror 212. Mirror 212 orthogonally reflects the reference beam back to PBS 208. After passing twice through QWP 216, the horizontally polarized reference beam now propagates through PBS 208 into retroreflector 224.

Retroreflector 224 returns the reference beam in an offset but parallel path through HWP 222. After passing through HWP 222, the vertically polarized reference beam now reflects from PBS 210 so it propagates through QWP 218 and onto reference plane mirror 144. Reference plane mirror 144 reflects the reference beam back onto itself, through QWP 218, and back to PBS 210. After passing twice through QWP 218, the horizontally polarized reference beam now propagates through PBS 210 and recombines with the measurement beam to form output beam 105B. Mirror 206C orthogonally reflects output beam 105B onto mirror 212, which orthogonally reflects output beam 105B through AR window 215 and into the detector.

As described above, interferometer 200 generates a beam pattern in which two reference beam passes are sandwiched between two measurement beam passes. Of course, the directions of the measurement and reference paths can be reversed and the measurement and the reference paths can be swapped. In one embodiment, HWP 222 is replaced with a QWP mounted directly on or indirectly adjacent to the entire vertical face 202A to generate the same beam pattern. In another embodiment, HWP 222 is removed all together to generate a different beam pattern consisting of a first measurement beam pass, a first reference beam pass, a second measurement beam pass, and a second reference beam pass.

Figure 3:
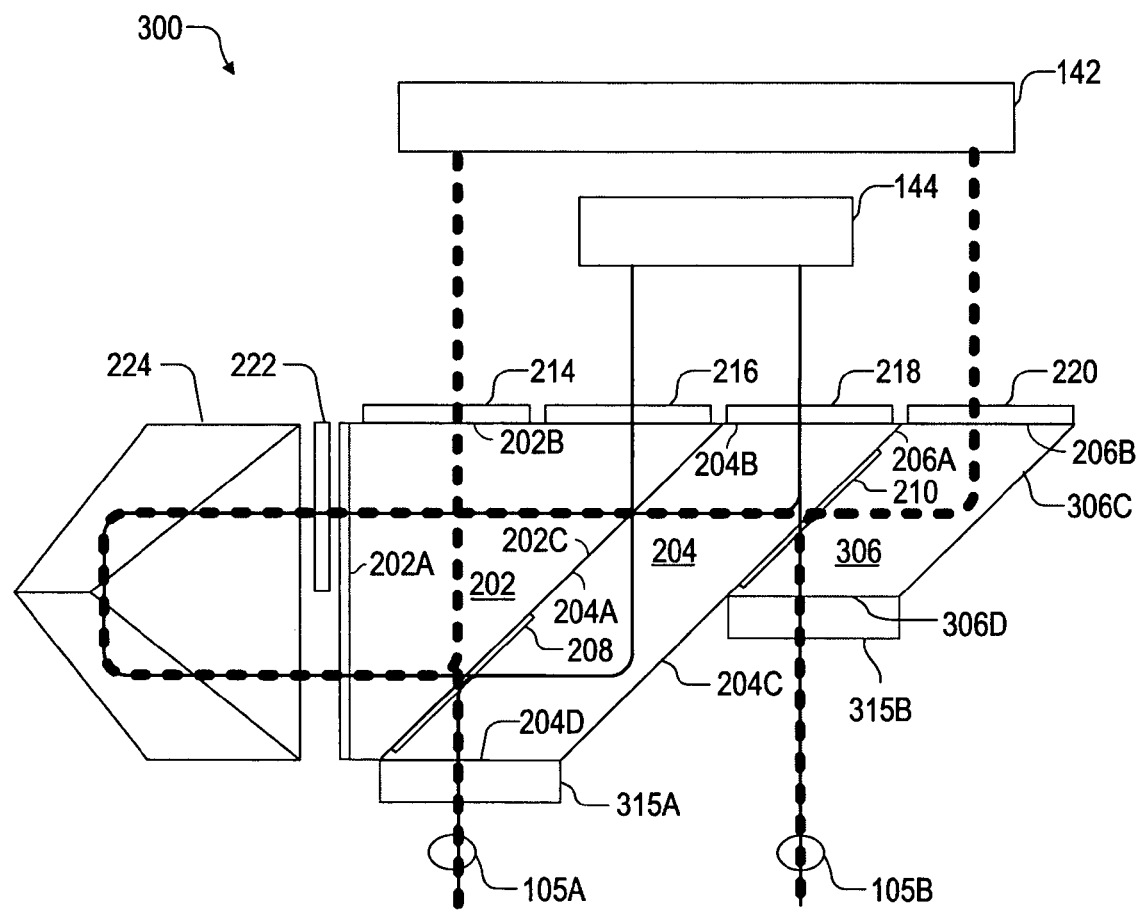

FIG. 3 illustrates a differential interferometer system 300 in one embodiment of the invention. Interferometer system 300 is similar to interferometer system 200 (FIG. 2) except that prism 206 is replaced with a shorter prism 306 so a lower portion of angled face 204C is exposed to another medium (e.g., air). Thus, the lower portion of angled face 204C serves as a TIR mirror. Note that an angled face 306C of prism 306 serves as a TIR mirror. In addition, an AR window 315A is mounted to horizontal face 204D to serve as an input port for input beam 105A, and an AR window 315B is mounted to horizontal face 306D to serve as an output port for output beam 105B.

In the measurement path, input beam 105A propagates through input port 315A and impinges PBS 208. With their initial polarization, the measurement propagates through PBS 208 while the reference beam reflects from PBS 208. The measurement beam then propagates through QWP 214 and onto measurement plane mirror 142. Measurement plane mirror 142 reflects the measurement beam back onto itself, through QWP 214, and back to PBS 208. After passing twice through QWP 214, the vertically polarized measurement beam now orthogonally reflects from PBS 208 and propagates into retroreflector 224.

Retroreflector 224 returns the measurement beam in an offset but parallel path through HWP 222. After passing through HWP 222, the horizontally polarized measurement beam now propagates through PBS 210 and onto mirror 306C. Mirror 306C orthogonally reflects the measurement beam through QWP 220 and onto measurement plane mirror 142. Measurement plane mirror 142 reflects the measurement beam back onto itself, through QWP 220, and back to mirror 306C. Mirror 306C then orthogonally reflects the measurement beam to PBS 210. After passing twice through QWP 220, the vertically polarized measurement beam now orthogonally reflects from PBS 210 so it propagates through output port 315B and into a detector.

In the reference path, PBS 208 orthogonally reflects the reference beam to mirror 204C. Mirror 204C orthogonally reflects the reference beam through QWP 216 and onto reference plane mirror 144. Reference plane mirror 144 reflects the reference beam back onto itself, through QWP 216, and back to mirror 204C. Mirror 204C orthogonally reflects the reference beam back to PBS 208. After passing twice through QWP 216, the horizontally polarized reference beam now propagates through PBS 208 and into retroreflector 224.

Retroreflector 224 returns the reference beam in an offset but parallel path through HWP 222. After passing through HWP 222, the vertically polarized reference beam now reflects from PBS 210 so it propagates through QWP 218 and onto reference plane mirror 144. Reference plane mirror 144 reflects the reference beam back onto itself, through QWP 218, and back to PBS 210. After passing twice through QWP 218, the horizontally polarized reference beam now propagates through PBS 210 and recombines with the measurement beam to form output beam 105B. Output beam 105B then propagates through output port 315B into the detector.

As described above, interferometer system 300 generates a beam pattern in which two reference beam passes are sandwiched between two measurement beam passes. Of course, the direction of the measurement and reference paths can be reversed and the measurement and the reference paths can be swapped. Like interferometer system 200, HWP 222 can be replaced with a QWP to generate the same beam pattern or removed all together to generate a different beam pattern consisting of a first measurement beam pass, a first reference beam pass, a second measurement beam pass, and a second reference beam pass.

Figure 4:
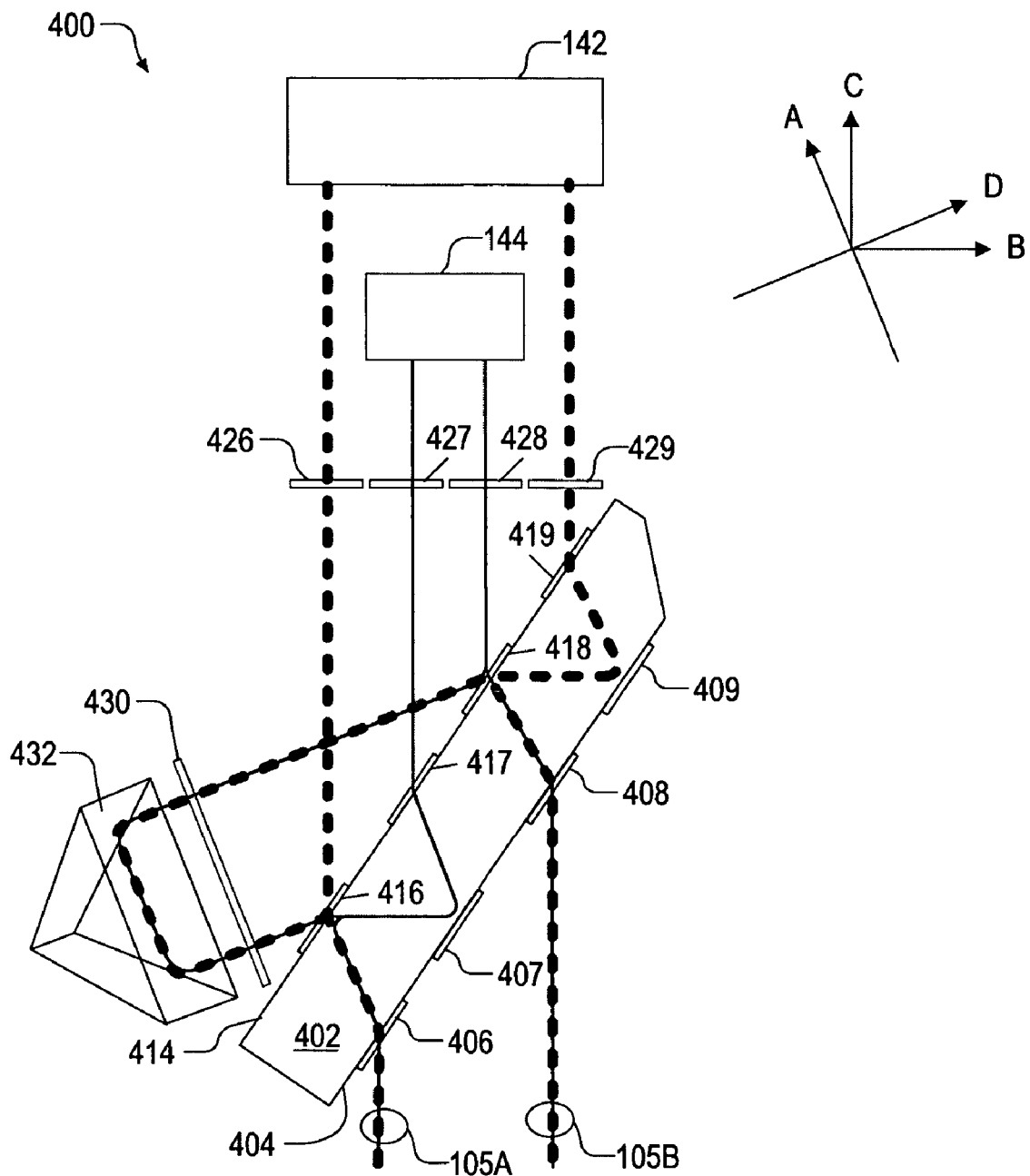

FIG. 4 illustrates a differential interferometer system 400 in one embodiment of the invention. Interferometer system 400 includes a shear plate 402 having parallel faces 404 and 414. Face 404 includes an input port 406, a mirror 407 adjacent to input port 406, an output port 408 adjacent to mirror 407, and a mirror 409 adjacent to output port 408. Input port 406 and output port 408 may consist of AR coatings or AR windows on face 404. Mirrors 407 and 409 may consist of HR coatings or mirror optics on face 404.

Face 414 includes a PBS 416, an intermediate port 417 adjacent to PBS 416, a PBS 418 adjacent to intermediate port 417, and an intermediate port 419 adjacent to PBS 418. PBSs 416 and 418 provide path isolation and recombination by propagating one linear polarization (e.g., vertical polarization) and reflecting another orthogonal linear polarization (e.g., horizontal polarization). PBS 416 is located (1) opposite input port 406 in a beam path parallel to a direction A and (2) opposite mirror 407 in a beam path parallel to a direction B. Directions A and B ultimately depend on the angle of shear plate 402 relative to input beam 105A. Intermediate port 417 is located opposite mirror 407 in a beam path parallel to direction A. PBS 418 is located (1) opposite output port 408 in a beam path parallel to direction A and (2) opposite mirror 409 in a beam path parallel to direction B. Intermediate port 419 is located opposite mirror 409 in a beam parallel to direction A. PBS 416 and 418 may consist of PBS coatings pr PBS optics on face 414. Intermediate ports 417 and 419 may consist of AR coatings pr AR windows on face 414.

A QWP element 426 is placed between PBS 416 and measurement plane mirror 142 in a measurement beam path parallel to a direction C. Direction C is the original direction of input beam 105A. A QWP element 427 is placed between intermediate port 417 and reference plane mirror 144 in a reference beam path parallel to direction C. A QWP element 428 is placed between PBS 418 and reference plane mirror 144 in another reference beam parallel to direction C. A QWP element 429 is placed between intermediate port 419 and measurement plane mirror 142 in another measurement beam path parallel to direction C. QWP elements 426, 427, 428, and 429 can be individual QWPs or part of a single QWP.

A QWP 430 and a redirecting optic 432 (e.g., a cube corner retroreflector) are placed opposite of PBSs 416 and 418 in beam paths parallel to a direction D. Direction D ultimately depends on the angle of shear plate 402 relative to input beam 105A.

In the measurement path, the air-glass interface at input port 406 refracts input beam 105A. Input beam 105 propagates through shear plate 402 to PBS 416. With their initial polarizations, the measurement beam propagates through PBS 416 and the reference beam reflects from PBS 416. At PBS 416, the glass-air interface refracts the measurement beam so it propagates through QWP 426 and onto measurement plane mirror 142. Measurement plane mirror 142 reflects the measurement beam back onto itself, through QWP 416, and back onto PBS 416. After passing twice through QWP 416, the vertically polarized measurement beam now reflects from PBS 416 so it propagates through QWP 430 and into retroreflector 432.

Retroreflector 432 returns the measurement beam in an offset but parallel path through QWP 430 and onto PBS 418. After passing twice through QWP 430, the horizontally polarized measurement beam now propagates through PBS 418. At PBS 418, the air-glass interface refracts the measurement beam so it propagates through shear plate 402 and onto mirror 409. Mirror 409 reflects the measurement beam to intermediate port 419. At intermediate port 419, the glass-air interface refracts the measurement beam so it propagates through QWP 429 and onto measurement plane mirror 142. Measurement plane mirror 142 reflects the measurement beam back onto itself and the measurement beam retraces its path back to PBS 418. After passing twice through QWP 429, the vertically polarized measurement beam now reflects from PBS 418 and propagates onto output port 408. At output port 408, the glass-air interface refracts the measurement beam so it propagates to a detector.

In the reference path, PBS 416 reflects the reference beam to mirror 407 and mirror 407 reflects the reference beam onto intermediate port 417. At intermediate port 417, the glass-air interface refracts the reference beam so it propagates through QWP 427 and onto reference plane mirror 144. Reference plane mirror 144 reflects the reference beam back onto itself and the reference beam retraces its path back to PBS 416. After passing twice through QWP 427, the horizontally polarized reference beam now propagates through PBS 416. At PBS 416, the glass-air interface refracts the reference beam so it propagates through QWP 430 into retroreflector 432.

Retroreflector 432 returns the reference beam in an offset but parallel path through QWP 430 and onto PBS 418. After passing twice through QWP 420, the vertically polarized reference beam now reflects from PBS 418 so it propagates through QWP 428 and onto reference plane mirror 144. Reference plane mirror 144 reflects the reference beam back onto itself, through QWP 428, and back to PBS 418. After passing twice through QWP 428, the horizontally polarized reference beam now propagates through PBS 418. At PBS 418, the reference beam is refracted by the air-glass interface and then recombined with the measurement beam to form output beam 105B. Output beam 105B then propagates through shear plate 402 to output port 408. At output port 408, the glass-air interface refracts output beam 105B so it propagates to the detector.

As described above, interferometer 400 generates a beam pattern in which two reference beam passes are sandwiched between two measurement beam passes. Of course, the directions of the measurement and reference paths can be reversed and the measurement and the reference paths can be swapped. In one embodiment, QWP 430 is removed all together to generate a different beam pattern consisting of a first measurement beam pass, a first reference beam pass, a second measurement beam pass, and a second reference beam pass.

Figure 5:
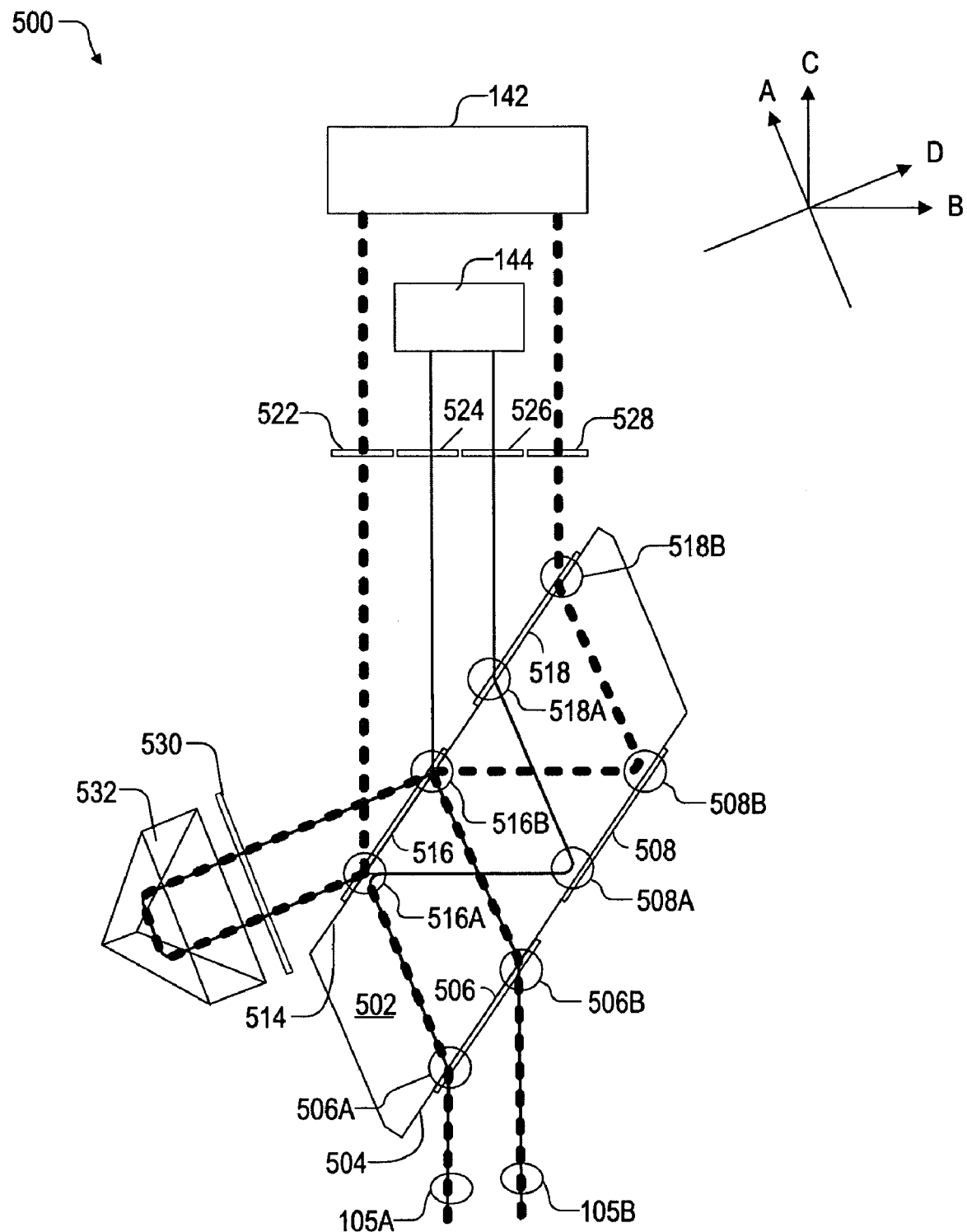

FIG. 5 illustrates a differential interferometer system 500 in one embodiment of the invention. Interferometer system 500 includes a shear plate 502 having parallel faces 504 and 514. Face 504 includes an input port 506A, an output port 506B adjacent to input port 506A, a mirror element 508A adjacent to output port 506B, and a mirror element 508B adjacent to mirror 508A. Input port 506A and output port 506B may consist the same AR coating or AR window 506 on face 504 while mirror elements 508A and 508B may consist the same HR coating or mirror optic 508 on face 504.

Face 514 includes a PBS element 516A, a PBS element 516B adjacent to PBS 516A, an intermediate port 518A adjacent to PBS 516B, and an intermediate port 518B adjacent to intermediate port 518A. PBS element 516A is located (1) opposite input port 506A in a beam path parallel to a direction A and (2) opposite mirror element 508A in a beam path parallel to a direction B. Directions A and B ultimately depend on the angle of shear plate 502 relative to input beam 105A. PBS element 516B is located (1) opposite output port 506B in a beam path parallel to direction A and (2) opposite mirror element 508B in a beam path parallel to direction B. PBS elements 516A and 516B provide path isolation and recombination by propagating one linear polarization (e.g., vertical polarization) and reflecting another orthogonal linear polarization (e.g., horizontal polarization). Intermediate port 518A is located opposite mirror element 508A in a beam path parallel to direction A. Intermediate port 518B is located opposite mirror element 508B in a beam path parallel to direction A. PBS elements 516A and 516B may consist the same PBS coating or PBS optic 516 on face 514 while intermediate ports 518A and 518B may consist the same AR coating or AR window 518 on face 514.

A QWP element 522 is placed between PBS element 516A and measurement plane mirror 142 in a measurement beam path parallel to a direction C. Direction C is the original direction of input beam 105A. A QWP element 524 is placed between PBS element 516B and reference plane mirror 144 in a reference beam path parallel to direction C. A QWP element 526 is placed between intermediate port 518A and reference plane mirror 144 in another reference beam path parallel to direction C. A QWP element 528 is placed between intermediate port 518B and measurement plane mirror 144 in another measurement beam path parallel to direction C. QWP elements 522, 524, 526, and 528 can be individual QWPs or part of a single QWP.

A QWP 530 and a redirecting optic 532 (e.g., a cube corner retroreflector) are placed opposite PBS elements 516A and 516B in beam paths parallel to a direction D. Direction D ultimately depends on the angle of shear plate 502 relative to input beam 105A.

In the measurement path, input beam 105A is refracted by the air-glass interface at input port 506A so it propagates through shear plate 502 and onto PBS 516A. With their initial polarizations, the measurement beam propagates through PBS 516A and the reference beam reflects from PBS 516A. The measurement beam then propagates through QWP 522 and onto measurement plane mirror 142. Measurement plane mirror 142 reflects the measurement beam back onto itself, through QWP 522, and back to PBS 516A. After passing twice through QWP 522, the vertically polarized measurement beam now reflects from PBS 516A so it propagates through QWP 530 and into retroreflector 532.

Retroreflector 532 returns the measurement beam in an offset but parallel path through QWP 530 and onto PBS 516B. After passing twice through QWP 530, the horizontally polarized measurement beam now propagates through PBS 516B. At PBS 516B, the air-glass interface refracts the measurement beam so it propagates through shear plate 502 and onto mirror 508B. Mirror 508B reflects the measurement beam to intermediate port 518B. At intermediate port 518B, the glass-air interface refracts the measurement beam so it propagates through QWP 528 and onto measurement plane mirror 142. Measurement plane mirror 142 reflects the measurement beam back onto itself and the measurement beam retraces its path back to PBS 516B. After passing twice through QWP 528, the vertically polarized measurement beam now reflects from PBS 516B and propagates to output port 506B. At output port 506B, the glass-air interface refracts the measurement beam so it propagates to a detector.

In the reference path, PBS 516A reflects the reference beam to mirror 508A and mirror 508A reflects the reference beam onto intermediate port 518A. At intermediate port 518A, the glass-air interface refracts the reference beam so it propagates through QWP 526 and onto reference plane mirror 144. Reference plane mirror 144 reflects the reference beam back onto itself and the reference beam retraces its path back to PBS 516A. After passing twice through QWP 526, the horizontally polarized reference beam now propagates through PBS 516A. At PBS 516A, the glass-air interface refracts the reference beam so it propagates through QWP 530 and into retroreflector 532.

Retroreflector 532 returns the reference beam in an offset but parallel path through QWP 530 and onto PBS 516B. After passing twice through QWP 530, the vertically polarized reference beam now reflects from PBS 516B so it propagates through QWP 524 and onto reference plane mirror 144. Reference plane mirror 144 reflects the reference beam back onto itself, through QWP 524, and back to PBS 516B. After passing twice through QWP 524, the horizontally polarized reference beam now propagates through PBS 516B. At PBS 516B, the reference beam is refracted by the air-glass interface and then recombined with the measurement beam to form output beam 105B. Output beam 105 then propagates through shear plate 502 and onto output port 506B. At output port 506B, the glass-air interface refracts output beam 105B so it propagates to the detector.

As described above, interferometer 500 generates a beam pattern in which two reference beam passes are sandwiched between two measurement beam passes. Of course, the directions of the measurement and reference paths can be reversed and the measurement and the reference paths can be swapped. In one embodiment, QWP 530 is removed all together to generate a different beam pattern consisting of a first measurement beam pass, a second measurement beam pass, a first reference beam pass, and a second reference beam pass.

Figure 6:
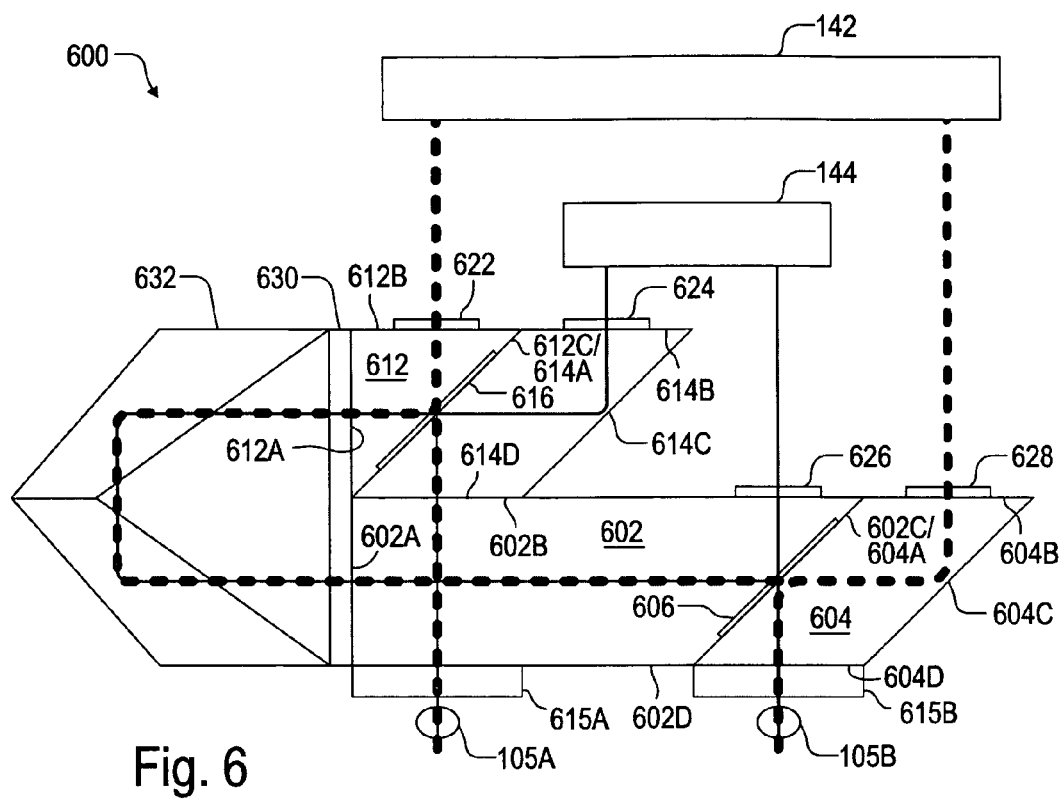

FIG. 6 illustrates a differential interferometer system 600 in one embodiment of the invention. Interferometer system 600 includes a rhomboid assembly having an upper optical stack mounted atop a lower optical stack. The lower optical stack includes a prism 602 and a prism 604. Prism 602 has a vertical face 602A, a horizontal face 602B, an angled face 602C (e.g., angled at 45 degrees), and a horizontal face 602D. An AR window 615A is mounted to a left portion of horizontal face 602D to serve as an input port for input beam 105A. Prism 604 has an angled face 604A (e.g., angled at 45 degrees), a horizontal face 604B, an angled face 604C (e.g., angled at 45 degrees), and a horizontal face 604D. An AR window 615B is mounted to horizontal face 604D to serve as an output port for output beam 105A. Note that angled face 604C serves as a TIR mirror.

Prism 602 is mounted to prism 604 by fixing (e.g., gluing) angled face 602C to angled face 604A. A PBS 606 is formed at the interface between prisms 602 and 604. In one embodiment, PBS 606 is a PBS coating formed on either angled face 602C or 604A.

The upper optical stack includes a prism 612 and a prism 614. Prism 612 has a vertical face 612A, a horizontal face 612B, and an angled face 612C (e.g., angled at 45 degrees). Prism 614 has an angled face 614A (e.g., angled at 45 degrees), a horizontal face 614B, an angled face 614C (e.g., angled at 45 degrees), and a horizontal face 614D. Note that angled face 614C serves as a TIR mirror.

Prism 612 is mounted to prism 614 by fixing angled face 612C to angled face 614A. A PBS 616 is formed at the interface between prisms 612 and 614. In one embodiment, PBS 616 is a PBS coating formed on either angled face 612C or 614A. PBSs 616 and 606 provide path isolation and recombination by propagating one linear polarization (e.g., vertical polarization) and reflecting another orthogonal linear polarization (e.g., horizontal polarization).

The upper optical stack is mounted atop the lower optical stack by fixing horizontal face 614D to a left portion of horizontal face 602B so that PBS 616 is located opposite input port 615A.

A QWP element 622 is mounted directly atop or indirectly above horizontal face 612B opposite PBS 616. A QWP element 624 is mounted directly atop or indirectly above horizontal face 614B opposite mirror 614C. A QWP element 626 is mounted directly atop or indirectly above a right portion of horizontal face 602B opposite PBS 606. A QWP element 628 is mounted directly atop or indirectly above horizontal face 604B opposite mirror 604C. Although illustrated individually, QWP elements 622, 624, 626, and 628 can be part of a single QWP mounted above the rhomboid assembly. Alternatively, QWP elements 622 and 624 can be a single QWP and QWP elements 626 and 628 can be a single QWP.

A QWP 630 is mounted directly on or indirectly adjacent to vertical faces 602A and 612A. A redirecting optic 632 (e.g., a cube corner retroreflector) has its entrance/exit face mounted directly on or indirectly adjacent to QWP 630.

In the measurement path, input beam 105A propagates through input port 615A and impinges PBS 616. With their initial polarizations, the measurement beam propagates through PBS 616 and the reference beam reflects from PBS 616. The measurement beam then propagates through QWP 622 and onto measurement plane mirror 142. Measurement plane mirror 142 reflects the measurement beam back onto itself, through QWP 622, and back to PBS 616. After passing twice through QWP 622, the vertically polarized measurement beam now reflects from PBS 616 so it propagates through QWP 630 and into retroreflector 632.

Retroreflector 632 returns the measurement beam in an offset but parallel path through QWP 630 and onto PBS 606. After passing twice through QWP 630, the horizontally polarized measurement beam now propagates through PBS 606 and onto mirror 604C. Mirror 604C orthogonally reflects the measurement beam through QWP 628 and onto measurement plane mirror 142. Measurement plane mirror 142 reflects the measurement beam back onto itself and the measurement beam retraces its path back to PBS 606. After passing twice through QWP 628, the vertically polarized measurement beam now reflects from PBS 606 so it propagates through output port 615B and into a detector.

In the reference path, PBS 616 orthogonally reflects the reference beam to mirror 614C. Mirror 614C orthogonally reflects the reference beam through QWP 624 and onto reference plane mirror 144. Reference plane mirror 144 reflects the reference beam back onto itself and the reference beam retraces its path back to PBS 616. After passing twice through QWP 624, the horizontally polarized reference beam now propagates through PBS 616 and QWP 630, and into retroreflector 632.

Retroreflector 632 returns the reference beam in an offset but parallel path through QWP 630. After passing twice through QWP 630, the vertically polarized reference beam now reflects from PBS 606 so it propagates through QWP 626 and onto reference plane mirror 144. Reference plane mirror 144 reflects the reference beam back onto itself, through QWP 626, and back onto PBS 606. After passing twice through QWP 626, the horizontally polarized reference beam now propagates through PBS 606 and recombines with the measurement beam to form output beam 105B. Output beam 105B then propagates through output port 615B and into the detector.

As described above, interferometer 600 generates a beam pattern in which two reference beam passes are sandwiched between two measurement beam passes. Of course, the direction of the measurement and reference paths can be reversed and the measurement and the reference paths can be swapped. In one embodiment, QWP 630 is removed all together to generate a different beam pattern consisting of a first measurement beam pass, a first reference beam pass, a second measurement beam pass, and a second reference beam pass.

Figure 7:
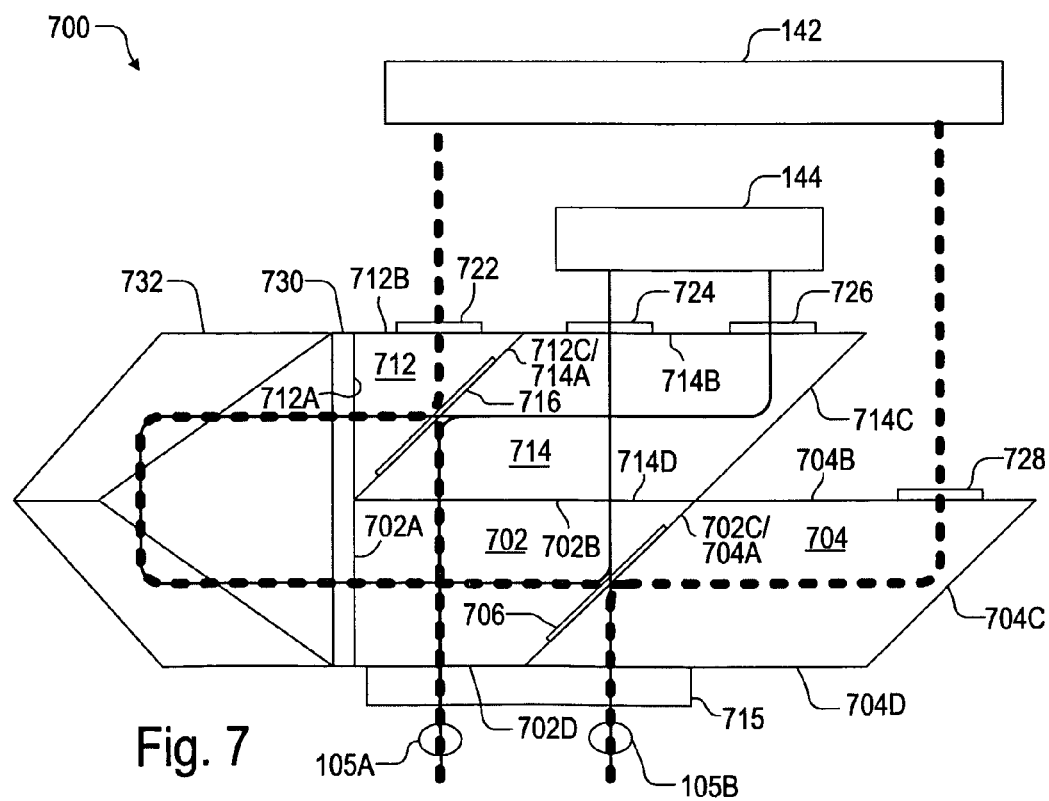

FIG. 7 illustrates a differential interferometer system 700 in one embodiment of the invention. Interferometer system 700 includes a rhomboid assembly having an upper optical stack mounted atop a lower optical stack. The lower optical stack includes a prism 702 and a prism 704. Prism 702 has a vertical face 702A, a horizontal face 702B, an angled face 702C (e.g., angled at 45 degrees), and a horizontal face 702D. Prism 704 has an angled face 704A (e.g., angled at 45 degrees), a horizontal face 704B, an angled face 704C (e.g., angled at 45 degrees), and a horizontal face 704D. An AR window 715 is mounted to horizontal face 702D and a left portion of horizontal face 704D to serve as input/output ports for input beam 105A and output beam 105B. Note that angled face 704C serves as a TIR mirror.

Prism 702 is mounted to prism 704 by fixing (e.g., gluing) angled face 702C to angled face 704A. A PBS 706 is formed at the interface between prisms 702 and 704. In one embodiment, PBS 706 is a PBS coating formed on either face 702C or 704A.

The upper optical stack includes a prism 712 and a prism 714. Prism 712 has a vertical face 712A, a horizontal face 712B, and an angled face 712C (e.g., angled at 45 degrees). Prism 714 has an angled face 714A (e.g., angled at 45 degrees), a horizontal face 714B, an angled face 714C (e.g., angled at 45 degrees), and a horizontal face 714D. Note that angled face 714C serves as a TIR mirror and is aligned with angled faces 702C and 704A.

Prism 712 is mounted to prism 714 by fixing angled face 712C to angled face 714A. A PBS 716 is formed at the interface between prisms 712 and 714. In one embodiment, PBS 716 is a PBS coating formed on either angled face 712C or 714A. PBSs 716 and 706 provide path isolation and recombination by propagating one linear polarization (e.g., vertical polarization) and reflecting another orthogonal linear polarization (e.g., horizontal polarization).

The upper optical stack is mounted atop the lower optical stack by fixing horizontal face 714D to the horizontal face 702B.

A QWP element 722 is mounted directly atop or indirectly above horizontal face 712B opposite PBS 716. QWP elements 724 and 726 are mounted directly atop or indirectly above horizontal face 714B opposite PBS 706 and mirror 714C, respectively. A QWP element 728 is mounted directly atop or indirectly above a right portion of horizontal face 704B opposite mirror 704C. A QWP 730 is mounted directly on or indirectly adjacent to vertical faces 702A and 712A. A redirecting optic 732 (e.g., a cube corner retroreflector) has its entrance/exit face mounted directly on or indirectly adjacent to QWP 730.

In the measurement path, input beam 105A propagates through AR window 715 to PBS 716. With their initial polarizations, the measurement beam propagates through PBS 716 and the reference beam reflects from PBS 716. The measurement beam then propagates through QWP 722 and onto measurement plane mirror 142. Measurement plane mirror 142 reflects the measurement beam back onto itself, through QWP 722, and back to PBS 716. After passing twice through QWP 722, the vertically polarized measurement beam now reflects from PBS 716 so it propagates through QWP 730 and into retroreflector 732.

Retroreflector 732 returns the measurement beam in an offset but parallel path through QWP 730 and onto PBS 706. After passing twice through QWP 730, the horizontally polarized measurement beam now propagates through PBS 706 and onto mirror 704C. Mirror 704C orthogonally reflects the measurement beam through QWP 728 and onto measurement plane mirror 142. Measurement plane mirror 142 reflects the measurement beam back onto itself and the measurement beam retraces its path back to PBS 706. After passing twice through QWP 728, the vertically polarized measurement beam now reflects from PBS 706 so it propagates through AR window 715 and into a detector.

In the reference path, PBS 716 orthogonally reflects the reference beam to mirror 714C. Mirror 714C orthogonally reflects the reference beam through QWP 726 and onto reference plane mirror 144. Reference plane mirror 144 reflects the reference beam back onto itself and the reference beam retraces its path back to PBS 716. After passing twice through QWP 726, the horizontally polarized reference beam now propagates through PBS 716 and QWP 730, and into retroreflector 732.

Retroreflector 732 returns the reference beam in an offset but parallel path through QWP 730 and onto PBS 706. After passing twice through QWP 730, the vertically polarized reference beam now reflects from PBS 706 so it propagates through QWP 724 and onto reference plane mirror 144.

Reference plane mirror 144 reflects the reference beam back onto itself, through QWP 724, and back to PBS 706. After passing twice through QWP 724, the horizontally polarized reference beam now propagates through PBS 706 and recombines with the measurement beam to form output beam 105B. Output beam 105B then propagates through AR window 715 and into the detector.

As described above, interferometer 700 generates a beam pattern in which two reference beam passes are sandwiched between two measurement beam passes. Of course, the directions of the measurement and reference paths can be reversed and the measurement and the reference paths can be swapped. In one embodiment, QWP 730 is removed all together to generate a different beam pattern consisting of a first measurement beam pass, a second measurement beam pass, a first reference beam pass, and a second reference beam pass.

Figures 8A, 8B:
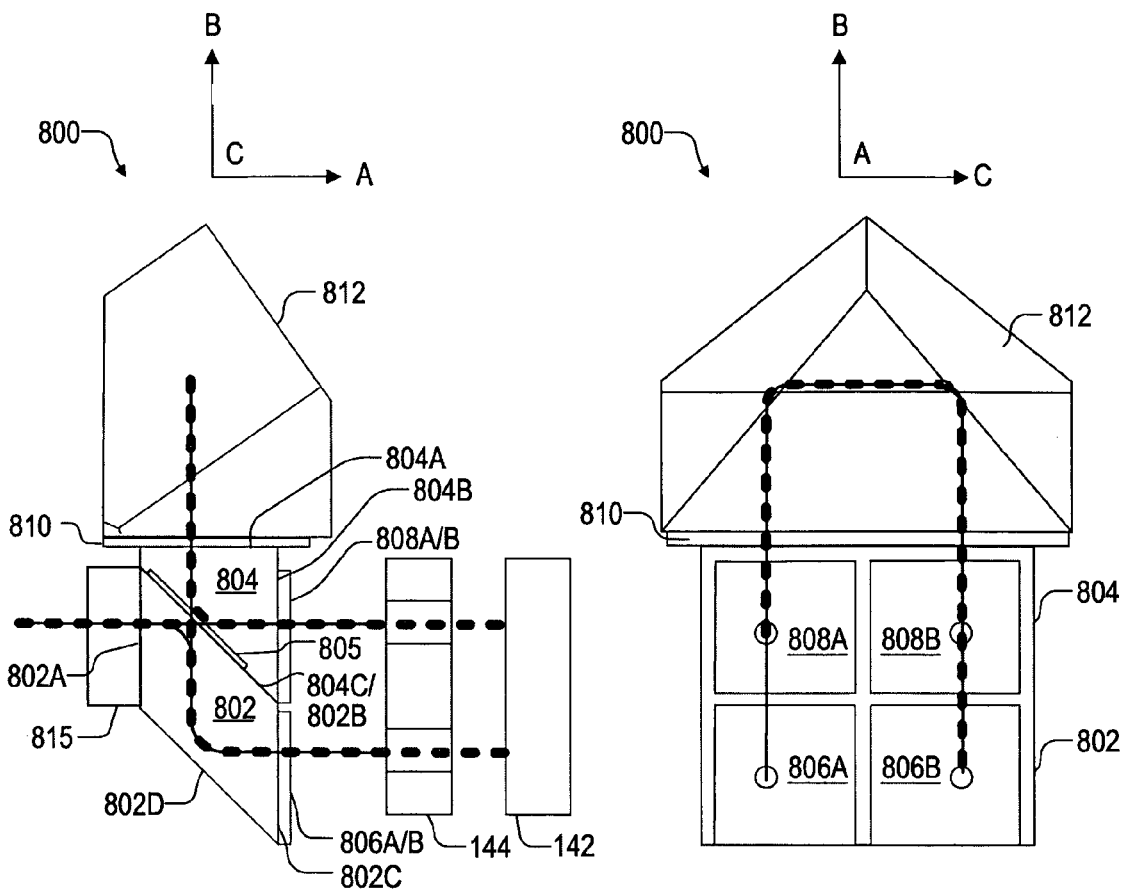
Figure 8C:
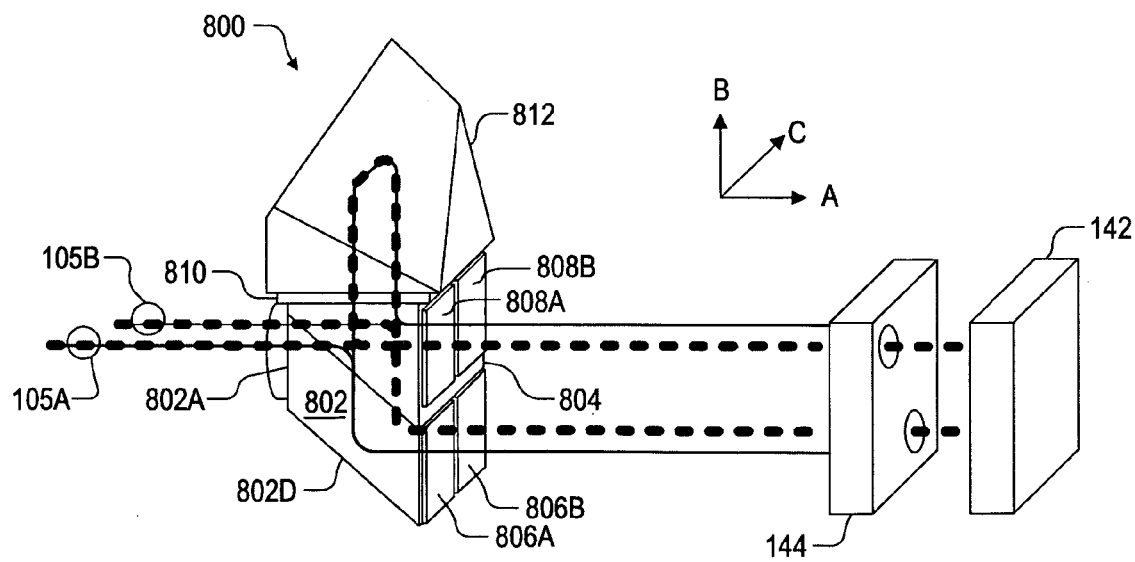

FIGS. 8A, 8B, and 8C illustrate a differential interferometer system 800 in one embodiment of the invention. Interferometer system 800 includes a rhomboid assembly having a lower prism 802 and an upper prism 804. Lower prism 802 has a vertical face 802A, an angled face 802B, a vertical face 802C, and an angled face 802D. Note that angled face 802D serves as a TIR mirror. An AR window 815 is mounted to vertical face 802A to serve as input/output ports for input beam 105A and output beam 105B.

Prism 804 includes a horizontal face 804A, a vertical face 804B, and an angled face 804C. Prism 804 is mounted atop prism 802 by fixing (e.g., gluing) the angled face 804C to angled face 802B. A PBS 805 is formed at the interface between prisms 802 and 804. In one embodiment, PBS 805 is a PBS coating formed on either face 804C or 802B. PBS 805 provides path isolation and recombination by propagating one linear polarization (e.g., vertical polarization) and reflecting another orthogonal linear polarization (e.g., horizontal polarization).

QWP elements 806A and 806B are mounted directly on or indirectly adjacent to vertical face 802C. QWP elements 808A and 808B are mounted directly on or indirectly adjacent to vertical face 804B. QWP elements 806A, 806B, 808A, and 808B can be individual QWPs or part of a single QWP. A QWP element 810 is mounted directly on or indirectly adjacent to horizontal face 804A. A redirecting optic 812 (e.g., a cube corner retroreflector) is mounted directly atop or indirectly above QWP 810.

In the measurement path, input beam 105A propagates through AR window 815 onto PBS 805. With their initial polarizations, the measurement beam propagates through PBS 805 while the reference beam reflects from PBS 805. The measurement beam then propagates along a direction A through QWP 808A and onto measurement plane mirror 142. In one embodiment, reference plane mirror 144 has openings through which the measurement beam passes through to reach measurement plane mirror 142. Measurement plane mirror 142 reflects the measurement beam back onto itself, through QWP 808A, and back to PBS 805. After passing twice through QWP 808A, the vertically polarized measurement beam now reflects from PBS 805 so it propagates along a direction B, which is orthogonal to direction A, through QWP 810 and into retroreflector 812.

Retroreflector 812 offsets the measurement beam along a direction C, which is orthogonal to both directions A and B, and then returns the measurement beam in a parallel path through QWP 810 and onto PBS 805. After passing twice through QWP 810, the horizontally polarized measurement beam now propagates along direction B through PBS 805 and onto mirror 802D. Mirror 802D orthogonally reflects the measurement beam along direction A through QWP 806B and onto measurement plane mirror 142. As described above, reference plane mirror 144 may have openings through which the measurement beam passes through to reach measurement plane mirror 142.

Measurement plane mirror 142 reflects the measurement beam back onto itself and the measurement beam retraces its path back to PBS 805. After passing twice through QWP 806B, the vertically polarized measurement beam now reflects from PBS 805 so it propagates along direction A through AR window 815 and into a detector.

In the reference path, PBS 805 orthogonally reflects the reference beam along direction B onto mirror 802D. Mirror 802D orthogonally reflects the reference beam along direction A through QWP 806A and onto reference plane mirror 144.

Reference plane mirror 144 reflects the reference beam back onto itself and the reference beam retraces its path back to PBS 805. After passing twice through QWP 806A, the horizontally polarized measurement beam now propagates through PBS 805 and QWP 810 into retroreflector 812.

Retroreflector 812 offsets the reference beam along direction C and then returns the reference beam in a parallel path through QWP 810 and onto PBS 805. After passing twice through QWP 810, the vertically polarized reference beam now reflects from PBS 805 so it propagates along direction A through QWP 808B and onto reference plane mirror 144.

Reference plane mirror 144 reflects the reference beam back onto itself, through QWP 808B, and back to PBS 805. After passing twice through QWP 808B, the horizontally polarized reference beam now propagates through PBS 805 and recombines with the measurement beam to form output beam 105B. Output beam 105B then propagates through AR window 815 and into the detector.

As described above and shown in FIG. 8B, interferometer 800 generates a beam pattern with upper left and lower right measurement passes, and upper right and lower left reference passes. Of course, the directions of the measurement and reference paths can be reversed and the measurement and the reference paths can be swapped. In one embodiment, QWP 810 is removed all together to generate a different beam pattern consisting of upper left and upper right measurement passes, and lower left and lower right reference passes.

Figure 9A:
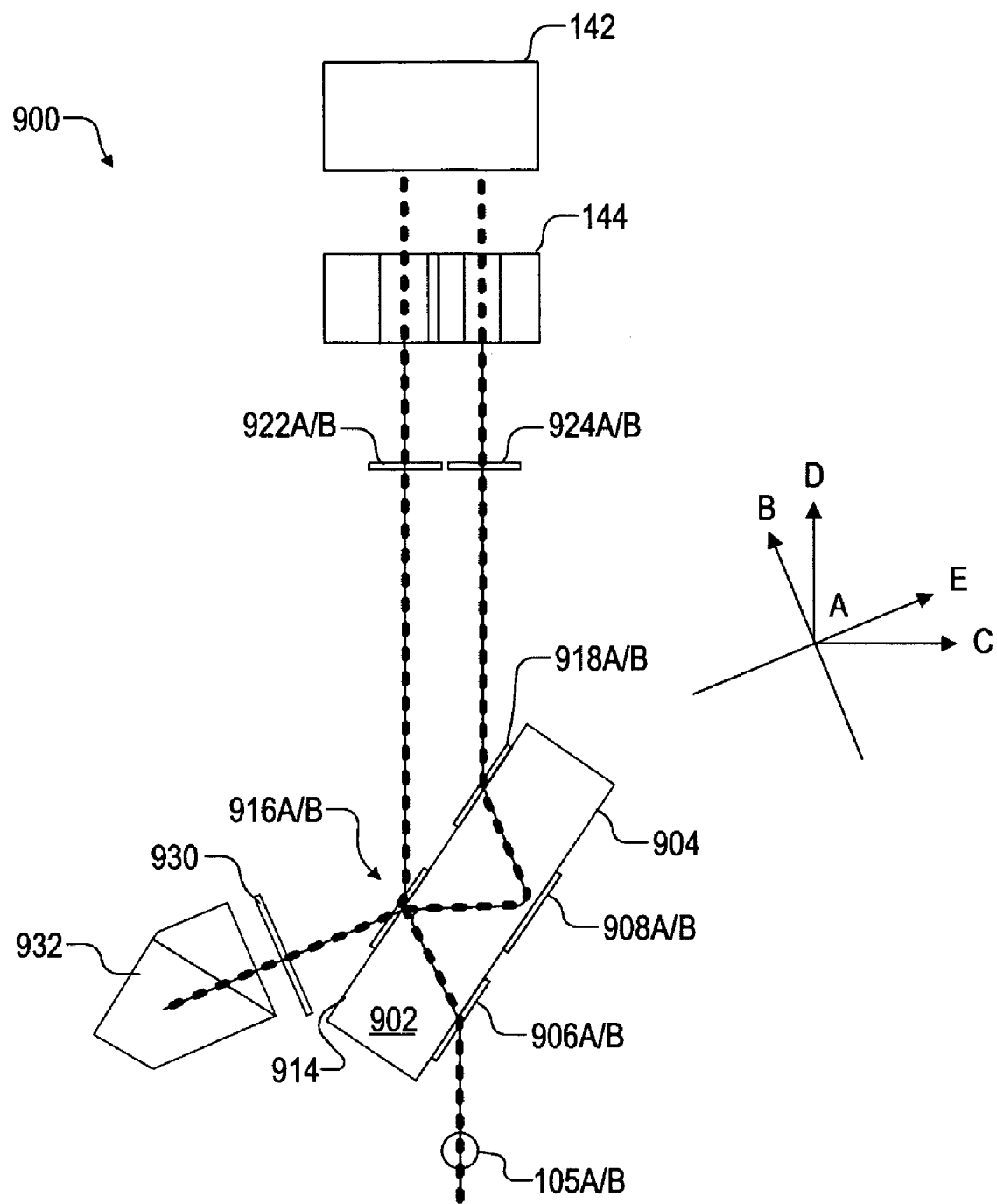
Figure 9B:
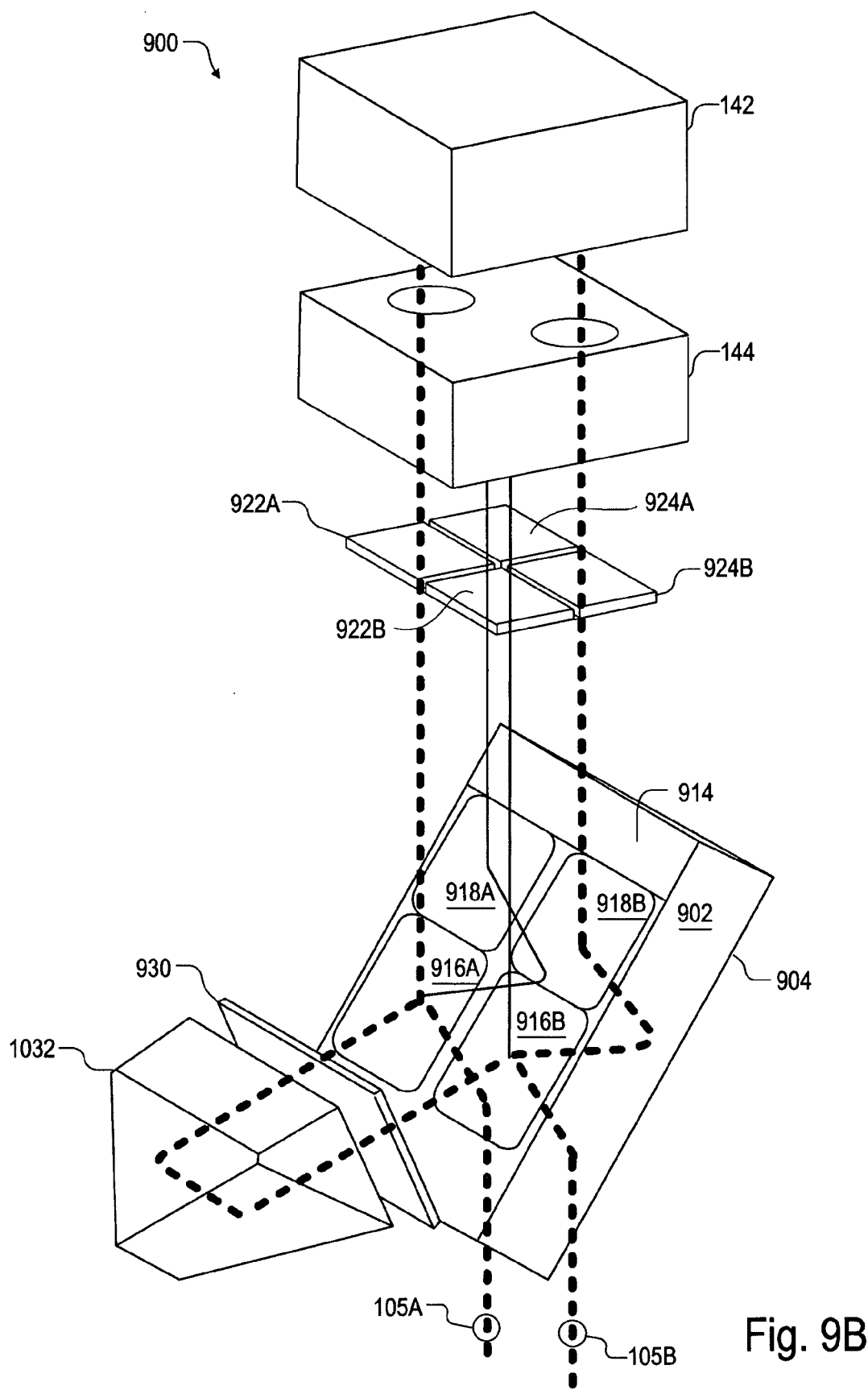
Figure 9C:
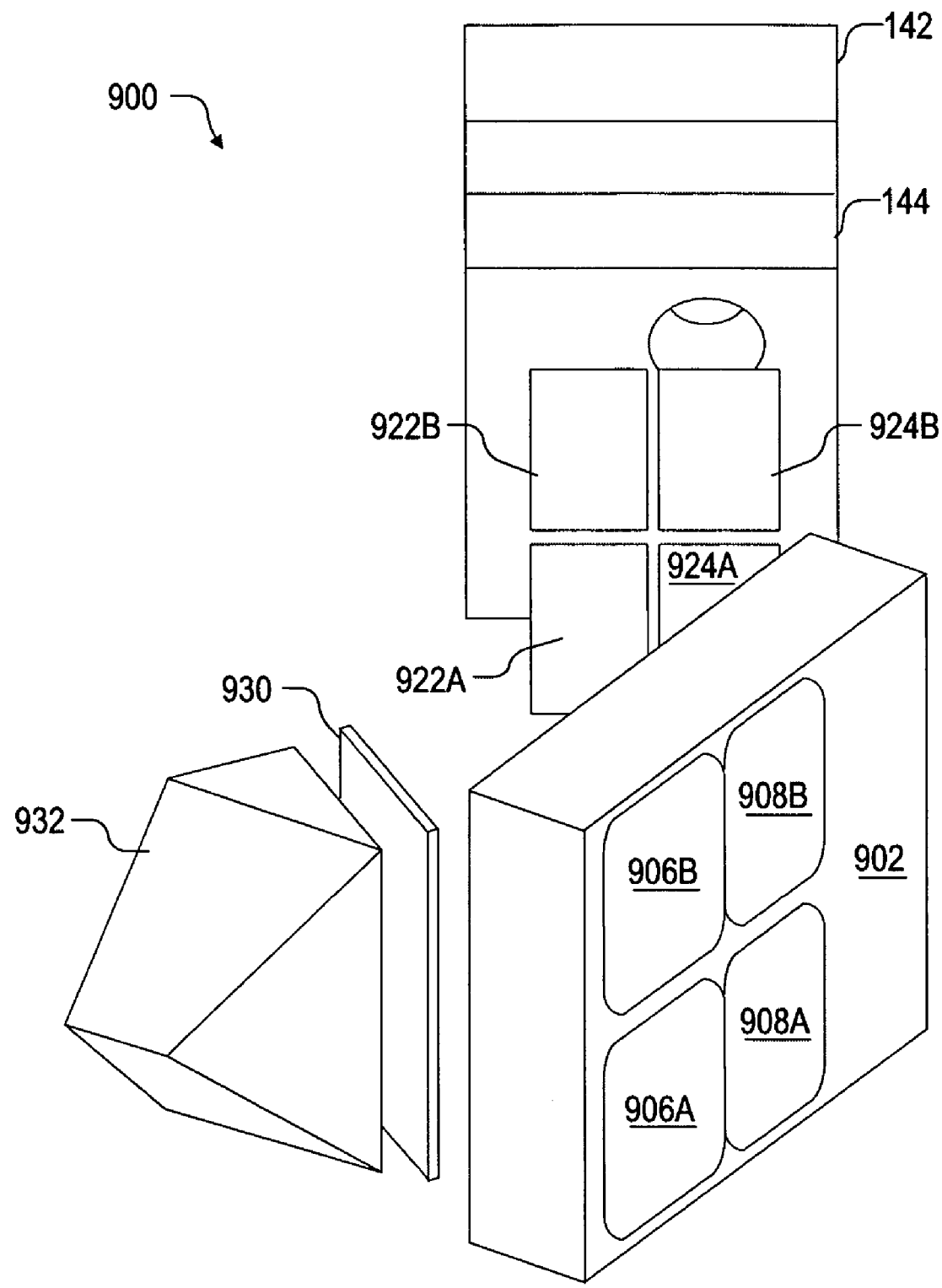

FIGS. 9A, 9B, and 9C illustrate a differential interferometer system 900 in one embodiment of the invention. Interferometer system 900 includes a shear plate 902 having parallel faces 904 and 914. Face 904 includes an input port 906A, an output port 906B offset from input port 906A along a direction A, a mirror element 908A, and a mirror element 908B offset from mirror 908A along direction A. Input port 906A and output port 906B may consist the same AR coating or AR window on face 904 while mirror elements 908A and 908B may consist the same HR coating or mirror optic on face 904.

Face 914 includes a PBS element 916A, a PBS element 916B offset from PBS element 916A along direction A, an intermediate port 918A adjacent to PBS 916A, and an intermediate port 918B offset from intermediate port 918A along direction A. PBS element 916A is located (1) opposite input port 906A in a beam path parallel to a direction B and (2) opposite mirror element 908A in a beam path parallel to a direction C. Directions B and C ultimately depend on the angle of shear plate 902 relative to input beam 105A. PBS element 916B is located (1) opposite output port 906B in a beam path parallel to direction B and (2) opposite mirror element 908B in a beam path parallel to direction C. PBS elements 916A and 916B provide path isolation and recombination by propagating one linear polarization (e.g., vertical polarization) and reflecting another orthogonal linear polarization (e.g., horizontal polarization). Intermediate port 918A is located opposite mirror element 908A in a beam path parallel to direction B. Intermediate port 918B is located opposite mirror element 908B in a beam path parallel to direction B. PBS elements 916A and 916B may consist the same PBS coating or PBS optic on face 914 while intermediate ports 918A and 918B may consist the same AR coating or AR window on face 914.

A QWP element 922A is placed in a measurement beam path between PBS 916A and measurement plane mirror 142 along a direction D. Direction D is the original direction of input beam 105A. A QWP element 922B is placed in a reference beam path between PBS 916B and reference plane mirror 144 along direction. A QWP element 924A is placed in another reference beam path between intermediate port 918A and reference plane mirror 144 along direction D. A QWP element 924B is placed in another measurement beam path between intermediate port 918B and measurement plane mirror 142 parallel to direction D. QWP elements 922A, 922B, 924A and 924B can be individual QWPs or part of a single QWP.

A QWP 930 and a redirecting optic 932 (e.g., a cube corner retroreflector) are placed opposite PBSs 916A and 916B in beam paths along a direction E. Direction E ultimately depends on the angle of shear plate 902 relative to input beam 105A. Directions B, C, D, and E are all in a plane that is orthogonal to direction A.

In the measurement path, the air-glass interface at input port 906A refracts input beam 105A so it propagates through shear plate 902 and onto PBS 916A. With their initial polarizations, the measurement beam is propagated through PBS 916A while the reference beam reflects from PBS 916A. At PBS 916A, the glass-air interface refracts the measurement beam so it propagates through QWP 922A and onto measurement plane mirror 142. In one embodiment, reference plane mirror 144 has openings through which the measurement beam passes through to reach measurement plane mirror 142. Measurement plane mirror 142 reflects the measurement beam back onto itself, through QWP 922A, and back onto PBS 916A. After passing twice through QWP 922A, the vertically polarized measurement beam now reflects from PBS 916A and propagates through QWP 930 into retroreflector 932.

Retroreflector 932 offsets the measurement beam along direction A and then returns the measurement beam in a parallel path through QWP 930 onto PBS 916B. After passing twice through QWP 930, the horizontally polarized measurement beam now propagates through PBS 916B. At PBS 916B, the air-glass interface refracts the measurement beam so it propagates through shear plate 902 and onto mirror 908B.

Mirror 908B reflects the measurement beam onto intermediate port 918B. At intermediate port 918B, the glass-air interface refracts the measurement beam so it propagates through QWP 924B and onto measurement plane mirror 142. In one embodiment, reference plane mirror 144 has openings through which the measurement beam passes through to reach measurement plane mirror 142. Measurement plane mirror 142 reflects the measurement beam back onto itself and the measurement beam retraces its path back to PBS 916B. After passing twice through QWP 924B, the vertically polarized measurement beam now reflects from PBS 916B and propagates to output port 904B. At output port 904, the glass-air interface refracts the measurement beam so it propagates to a detector.

In the reference path, PBS 916A reflects the reference beam to mirror 908A. Mirror 908A reflects the reference beam into intermediate port 918A. At intermediate port 918A, the glass-air interface refracts the reference beam so it propagates through QWP 924A and onto reference plane mirror 144.

Reference plane mirror 144 reflects the reference beam back onto itself and the reference beam retraces its path back to PBS 916A. After passing twice through QWP 924A, the horizontally polarized reference beam now propagates through PBS 916A. At PBS 916A, the glass-air interface refracts the reference beam so it propagates through QWP 930 and into retroreflector 932.

Retroreflector 932 offsets the reference beam along direction A and then returns the reference beam in a parallel path through QWP 930 and onto PBS 916B. After passing twice through QWP 930, the vertically polarized reference beam now reflects from PBS 916B and propagates through QWP 922B onto reference plane mirror 144. Reference plane mirror 144 reflects the reference beam back onto itself, through QWP 922B, and back to PBS 916B. After passing twice through QWP 922B, the horizontally polarized reference beam now propagates through PBS 916B and recombines with the measurement beam to form output beam 105B. At PBS 916B, the air-glass interface refracts output beam 105B so it propagates through shear plate 902 and onto output port 906B. At output port 906B, the glass-air interface refracts output beam 105B so it propagates into the detector.

As described above and shown in FIG. 9B, interferometer 900 generates a beam pattern with upper left and lower right measurement passes, and upper right and lower left reference passes. Of course, the directions of the measurement and reference paths can be reversed and the measurement and the reference paths can be swapped. In one embodiment, QWP 930 is removed all together to generate a different beam pattern consisting of upper left and upper right measurement passes, and lower left and lower right reference passes.

Various other adaptations and combinations of features of the embodiments disclosed are within the scope of the invention. Although an optical component is shown mounted to another, the components can simply be placed adjacent to each other in the beam's path. Furthermore, although QWPs and HWPs are described, the retardation of these wave plates can be adjusted to compensate the actual polarization of the measurement and reference beams. Numerous embodiments are encompassed by the following claims.

What is claimed is:
1. An interferometer system, comprising:
  a rhomboid assembly, comprising:
    a first optical stack, comprising:
      a first prism comprising a first vertical face and a first angled face;
      a second prism comprising a second angled face and a third angled face, wherein:
        the first prism is mounted to the second prism by fixing the first angled face to the second angled face;
        a first interface between the first and the second angled faces comprises a first polarizing beamsplitter (PBS);

the third angled face comprises a first mirror;
a second optical stack atop the first optical stack, comprising:
a third prism comprising a second vertical face and a fourth angled face;
a fourth prism comprising a fifth angled face and a sixth angled face, wherein:
the third prism is mounted to the fourth prism by fixing the fourth angled face to the fifth angled face;
a second interface between the fourth and the fifth angled faces comprises a second PBS;
the sixth angled face comprises a second mirror;
a first wave plate element, a second wave plate element, a third wave plate element, and a fourth wave plate element located in beam paths between the rhomboid assembly and at least one a measurement optic and a reference optic; and
a redirecting optic located at least adjacent to the first vertical face and the second vertical face.

2. The system of claim 1, further comprising:
a fifth wave plate element located between (1) the redirecting optic and (2) the first and the second vertical faces.

3. The system of claim 2, wherein:
the fourth angled face and the fifth angled face are substantially aligned with the third angled face;
the first wave plate element is mounted opposite the first PBS in a first beam path between the first PBS and one of the measurement optic and the reference optic;
the second wave plate element is mounted opposite the first mirror in a second beam path between the first mirror and another one of the measurement optic and the reference optic;
the third wave plate element is mounted opposite the second PBS in a third beam path between the second PBS and said another one of the measurement optic and the reference optic;
the fourth wave plate element is mounted opposite the second mirror and in a fourth beam path between the second mirror and said one of the measurement optic and the reference optic.

4. The system of claim 3, wherein:
the first, the second, the third, the fourth, and the fifth wave plate elements are quarter-wave plates;
the first and the second PBSs comprise PBS coatings;
the first and the second mirrors comprise total internal reflection mirrors;
the redirecting optic is a retroreflector;
the measurement optic is a measurement plane mirror; and
the reference optic is a reference plane mirror.

5. The system of claim 4, wherein the first, the second, the third, the fourth, and the fifth wave plate elements are individual quarter-wave plates.

6. The system of claim 2, wherein:
the first PBS is located opposite an output port in the second prism;
the second PBS is located opposite an input port in the first prism;
the first wave plate element is mounted opposite the second PBS in a first beam path between the second PBS and one of the measurement optic and the reference optic;
the second wave plate element is mounted opposite the second mirror in a second beam path between the second mirror and another one of the measurement optic and the reference optic;
the third wave plate element is mounted opposite the first PBS in a third beam path between the first PBS and said another one of the measurement optic and the reference optic; and
the fourth wave plate element is mounted opposite the first mirror in a fourth beam path between the first mirror and said one of the measurement optic and the reference optic.

7. The system of claim 6, wherein:
the first, the second, the third, the fourth, and the fifth wave plate elements are quarter-wave plates;
the first and the second PBSs comprise PBS coatings;
the first and the second mirrors comprise total internal reflection mirrors;
the redirecting optic is a retroreflector;
the measurement optic is a measurement plane mirror; and
the reference optic is a reference plane mirror.

8. The system of claim 7, wherein the first, the second, the third, and the fourth, wave plate elements are individual quarter-wave plates.

9. The system of claim 2, wherein:
the sixth angled face is substantially aligned with the first angled face and the second angled face;
the first wave plate element is mounted opposite the second PBS in a first beam path between the second PBS and one of the measurement optic and the reference optic;
the second wave plate element is mounted opposite the first PBS in a second beam path between the first PBS and another one of the measurement optic and the reference optic;
the third wave plate element is mounted opposite the second mirror in a third beam path between the second mirror and said another one of the measurement optic and the reference optic; and
the fourth wave plate element is mounted opposite the first mirror in a fourth beam path between the first mirror and the said one of the measurement optic and the reference optic.

10. The system of claim 9, wherein:
the first, the second, the third, the fourth, and the fifth wave plate elements are quarter-wave plates;
the first and the second PBSs comprise PBS coatings;
the first and the second mirrors comprise total internal reflection mirrors;
the redirecting optic is a retroreflector;
the first optic is a measurement plane mirror; and
the second optic is a reference plane mirror.

11. The system of claim 10, wherein the first, the second, the third, and the fourth, wave plate elements are individual quarter-wave plates.

12. An interferometer, comprising:
an optical stack comprising:
a first prism comprising a vertical face and a first angled face;
a second prism comprising a second angled face and a third angled face, wherein:
the first prism is mounted to the second prism by fixing the first angled face to the second angled face;
a lower portion of a first interface between the first and the second angled faces comprises a first polarizing beam-splitter (PBS);

a third prism comprising a fourth angled face and a fifth angled face, wherein:
the second prism is mounted to the third prism by fixing the third angled face to the fourth angled face;
a second interface between the third and the fourth angled faces comprises at least a second PBS;
the fifth angled face comprises a first mirror;
a first wave plate element, a second wave plate element, a third wave plate element, and a fourth wave plate element located in beam paths between the optical stack and at least one of a measurement optic and a reference optic;
a redirecting optic mounted at least adjacent to the vertical face.

13. The system of claim 12, further comprising:
a fifth wave plate element located between the redirecting optic and at least a portion of the vertical face.

14. The system of claim 13, wherein the second PBS comprises an upper portion of the second interface and a lower portion of the second interface comprises a second mirror.

15. The system of claim 14, wherein:
the first wave plate element is mounted opposite the first PBS in a first beam path between the first PBS and one of the measurement optic and the reference optic;
the second wave plate element is mounted opposite the second mirror in a second beam path between the second mirror and another one of the measurement optic and the reference optic;
the third wave plate element is mounted opposite the second PBS in a third beam path between the second PBS and said another one of the measurement optic and the reference optic;
the fourth wave plate element is mounted opposite an upper portion of the first mirror and in a fourth beam path between the upper portion of the first mirror and said one of the measurement optic and the reference optic.

16. The system of claim 15, wherein:
the first, the second, the third, and the fourth wave plate elements are quarter-wave plates;
the fifth wave plate element is selected from the group consisting of a half-wave plate that corresponds to only a portion of the vertical face or a quarter-wave plate that corresponds to the entire vertical face;
the first and the second PBSs comprise PBS coatings;
the first mirror comprises a total internal reflection mirror;
the second mirror comprises a high reflectance coating;
the redirecting optic is a retroreflector;
the measurement optic is a measurement plane mirror; and
the reference optic is a reference plane mirror.

17. The system of claim 16, wherein the first, the second, the third, and the fourth, wave plate elements are individual quarter-wave plates.

18. The system of claim 13, wherein the second interface comprises an upper portion of the third angled face and the fourth angled face, wherein a lower portion of the third angled face comprises a second mirror.

19. The system of claim 18, wherein:
the first wave plate element is mounted opposite the first PBS in a first beam path between the first PBS and one of the measurement optic and the reference optic;
the second wave plate element is mounted opposite the second mirror in a second beam path between the second mirror and another one of the measurement optic and the reference optic;
the third wave plate element is mounted opposite the second PBS in a third beam path between the second PBS and said another one of the measurement optic and the reference optic;
the fourth wave plate element is mounted opposite the first mirror in a fourth beam path between the first mirror and said one of the measurement optic and the reference optic.

20. The system of claim 19, wherein:
the first, the second, the third, and the fourth wave plate elements are quarter-wave plates;
the fifth wave plate element is selected from the group consisting of a half-wave plate that corresponds to only a portion of the vertical face or a quarter-wave plate that corresponds to the entire vertical face;
the first and the second PBSs comprise PBS coatings;
the first and the second mirrors comprise total internal reflection mirrors;
the redirecting optic is a retroreflector;
the measurement optic is a measurement plane mirror; and
the reference optic is a reference plane mirror.

21. The system of claim 20, wherein the first, the second, the third, and the fourth, wave plate elements are individual quarter-wave plates.

22. An interferometer, comprising:
a shear plate comprising:
a first face comprising:
an input port;
a first mirror adjacent to the input port;
an output port adjacent to the first mirror; and
a second mirror adjacent to the output port;
a second face parallel to the first face, the second face comprising:
a first polarizing beam-splitter (PBS) opposite the input port along a first direction and opposite the first mirror along a second direction;
a first intermediate port adjacent to the first PBS and opposite the first mirror along the first direction;
a second PBS adjacent to the first intermediate port and opposite the output port along the first direction and opposite the second mirror along the second direction;
a second intermediate port adjacent to the second PBS and opposite the second mirror along the first direction;
a first wave plate element opposite the first PBS in a first beam path between the first PBS and a first optic along third direction;
a second wave plate element opposite the first intermediate port in a second beam path between the first intermediate port and a second optic along the third direction;
a third wave plate element opposite the second PBS in a third beam path between the second PBS and the second optic along the third direction;
a fourth wave plate element opposite the second intermediate port in a fourth beam path between the second intermediate port and the first optic along the third direction; and
a redirecting optic opposite the first and the second PBSs in a beam path along a fourth direction.

23. The system of claim 22, further comprising:
a fifth wave plate element located between the redirecting optic and the first and the second PBSs.

24. The system of claim 23, wherein the redirecting optic is oriented to return light in an offset but parallel path in a plane defined by the first, the second, the third, and the fourth directions.

25. The system of claim 24, wherein:
the first, the second, the third, the fourth, and the fifth wave plate elements are quarter-wave plates;
the first and the second PBSs comprise PBS coatings;
the input, the output, the first intermediate, and the second intermediate ports comprise antireflection coatings;
the first and the second mirrors comprise mirror coatings;
the redirecting optic is a retroreflector;
the first optic is a measurement plane mirror; and
the second optic is a reference plane mirror.

26. The system of claim 25, wherein the first, the second, the third, and the fourth, wave plate elements are individual quarter-wave plates.

27. An interferometer system, comprising:
a first prism comprising a first vertical face, a first angled face, a second vertical face, and a second angled face, wherein the second angled face comprises a mirror for reflecting light between a first direction and a second direction orthogonal to the first direction;
a second prism comprising a horizontal face, a third vertical face, and a third angled face, wherein:
the second prism is mounted to the first prism by fixing the third angled face to the first angled face;
an interface between the first and the third angled faces comprises a polarizing beam-splitter (PBS) opposite the mirror for transmitting light along one of the first and the second directions, and reflecting light between the first and the second directions;
a first wave plate element and a second wave plate element mounted at least adjacent to the second vertical face opposite the mirror in a first plurality of beam paths between the mirror and at least one of a measurement optic and a reference optic;
a third wave plate element and a fourth wave plate element mounted at least adjacent to the third vertical face opposite the PBS in a second plurality of beam paths between the PBS and at least one of the measurement optic and the reference optic; and
a redirecting optic mounted at least adjacent to the horizontal face of the second prism, the redirecting optic returning light in a parallel path offset along a third direction orthogonal to the first and the second directions.

28. The system of claim 27, further comprising:
a fifth wave plate element located between the redirecting optic and the horizontal face of the second prism.

29. The system of claim 28, wherein:
the first, the second, third, fourth, and the fifth wave plate elements are quarter-wave plates;
the PBS comprises a PBS coating;
the mirror comprises a total internal reflection mirror;
the redirecting optic is a retroreflector;
the measurement optic is a measurement plane mirror; and
the reference optic is a reference plane mirror.

30. The system of claim 29, wherein the first, the second, the third, the fourth, and the fifth wave plate elements are individual quarter-wave plates.

31. An interferometer system, comprising:
a shear plate, comprising:
a first angled face, comprising:
an input port;
an output port adjacent to the input port;
a first mirror;
a second mirror adjacent to the first mirror;
a second angled face parallel to the first angled face, the second angled face comprising:
a first polarizing beam-splitter (PBS) opposite the input port along a first direction and opposite the first mirror along a second direction;
a second PBS opposite the output port along the first direction and opposite the second mirror along the second direction;
a first intermediate port opposite the first mirror along the first direction;
a second intermediate port opposite the second mirror along the first direction;
a first wave plate element opposite the first PBS in a first beam path between the first PBS and a first optic along a third direction;
a second wave plate element opposite the second PBS in a second beam path between the second PBS and a second optic along the third direction;
a third wave plate element opposite the first intermediate port in a third beam path between the first intermediate port and the second optic along the third direction;
a fourth wave plate element opposite the second intermediate port in a fourth beam path between the second intermediate port and the first optic along the third direction; and
a redirecting optic opposite the first and the second PBSs in a fifth beam path along a fourth direction.

32. The system of claim 31, further comprising:
a fifth wave plate element located between the redirecting optic and the first and the second PBSs.

33. The system of claim 32, wherein the redirecting optic is oriented to return light in an offset but parallel path located in a plane defined by the first, the second, the third, and the fourth directions.

34. The system of claim 33, wherein:
the input port and the output port comprise one antireflective coating;
the first mirror and the second mirror comprise one high reflective coating;
the first PBS and the second PBS comprise one PBS coating; and
the first intermediate port and the second intermediate port comprise one antireflective coating.

35. The system of claim 33, wherein:
the first, the second, the third, the fourth, and the fifth wave plate elements are quarter-wave plates;
the redirecting optic is a retroreflector;
the first optic is a measurement plane mirror; and
the second optic is a reference plane mirror.

36. The system of claim 35, wherein the first, the second, the third, the fourth, and the fifth wave plate elements are individual wave plates.

37. The system of claim 32, wherein the redirecting optic is oriented to return light in a parallel path offset along a fifth direction orthogonal to a plane defined by the first, the second, the third, and the fourth directions.

38. The system of claim 37, wherein:
the input port and the output port comprise antireflective coatings;
the first mirror and the second mirror comprise high reflective coatings;
the first PBS and the second PBS comprise PBS coatings; and
the first intermediate port and the second intermediate port comprise antireflective coatings.

39. The system of claim 38, wherein:
the first, the second, the third, the fourth, and the fifth wave plate elements are quarter-wave plates;
the input and output ports are offset from each other along the fifth direction;
the first and the second mirrors are offset from each other along the fifth direction;
the first and the second PBSs are offset from each other along the fifth direction;
the first and the second intermediate ports are offset from each other along the fifth direction;
the redirecting optic is a retroreflector;
the first optic is a measurement plane mirror; and
the second optic is a reference plane mirror.

40. The system of claim 39, wherein the first, the second, the third, the fourth, and the fifth wave plate elements are individual quarter-wave plates.

* * * * *

UNITED STATES PATENT AND TRADEMARK OFFICE
CERTIFICATE OF CORRECTION

| | | |
|---|---|---|
| PATENT NO. | : 7,212,290 B2 | Page 1 of 1 |
| APPLICATION NO. | : 10/900529 | |
| DATED | : May 1, 2007 | |
| INVENTOR(S) | : Fine et al. | |

It is certified that error appears in the above-identified patent and that said Letters Patent is hereby corrected as shown below:

In column 20, line 51, in Claim 22, before "third" insert -- a --.

Signed and Sealed this

Twenty-seventh Day of November, 2007

JON W. DUDAS
*Director of the United States Patent and Trademark Office*